(12) United States Patent
Adler

(10) Patent No.: US 10,007,891 B2
(45) Date of Patent: Jun. 26, 2018

(54) RE-PROCESSING REQUESTS IN AUTOMATED WAREHOUSES

(71) Applicant: SAP SE, Walldorf (DE)

(72) Inventor: Tobias Adler, Viernheim (DE)

(73) Assignee: SAP SE, Walldorf (DE)

( * ) Notice: Subject to any disclaimer, the term of this patent is extended or adjusted under 35 U.S.C. 154(b) by 363 days.

(21) Appl. No.: 14/857,827

(22) Filed: Sep. 18, 2015

(65) Prior Publication Data

US 2017/0083852 A1    Mar. 23, 2017

(51) Int. Cl.
  *G06Q 10/08*    (2012.01)
(52) U.S. Cl.
  CPC .................. *G06Q 10/087* (2013.01)
(58) Field of Classification Search
  None
  See application file for complete search history.

(56) References Cited

U.S. PATENT DOCUMENTS

| 7,861,246 | B2 * | 12/2010 | Lu ........................ G06F 9/5072 |
| | | | 709/201 |
| 9,613,335 | B2 * | 4/2017 | Grissom .............. G06Q 10/087 |
| 2006/0230305 | A1 * | 10/2006 | Smith ..................... H04L 12/66 |
| | | | 714/4.4 |
| 2010/0057515 | A1 * | 3/2010 | Gandini ................. G06Q 10/06 |
| | | | 705/7.27 |
| 2014/0281699 | A1 * | 9/2014 | Kota ................. G06F 17/30563 |
| | | | 714/15 |
| 2015/0113323 | A1 * | 4/2015 | Hui ..................... G06F 9/30145 |
| | | | 714/17 |
| 2016/0210583 | A1 * | 7/2016 | Guillard ............... G06Q 10/087 |

* cited by examiner

*Primary Examiner* — Scott A Zare
(74) *Attorney, Agent, or Firm* — Buckley, Maschoff & Talwalkar LLC

(57) ABSTRACT

Methods and system are disclosed that improve warehouse management operations. in one aspect, an enterprise application (e.g., warehouse management system) receives a message to process a request from a programmable logic controller. In response to a failure to process the request, status identifiers may be determined. The status identifiers may indicate errors that may have resulted in response to the failure to process the request. Based on the errors, the enterprise application may be configured with time intervals to re-process the request. After a lapse of the configured time interval, the enterprise application may be asynchronously triggered to automatically re-process the request.

17 Claims, 6 Drawing Sheets

RE-PROCESSING REQUESTS IN AUTOMATED WAREHOUSES

BACKGROUND

Optimized warehouse management practices play a significant role in smoother operations in a warehouse. When there is an error in operations in the warehouse, a warehouse management personnel may have to physically intervene to investigate and resolve the errors to ensure resumption of the operations. Typically such practices are cumbersome and may further add to the operational costs and delays.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques related to re-processing requests in automated warehouses are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A warehouse management system (WMS) consists of an interconnection of functional subsystems that control the movement and storage of goods in a warehouse. The warehouse management operations involve the receipt, storage and movement of goods to intermediate storage locations or to a final customer. The movement of goods within the warehouses may be manual or automated. Typically, in automated warehouses the WMS may control the movement of goods by communicating with the functional subsystems in the warehouse. The WMS may use request-reply based communication for transporting goods within the warehouse. The WMS may manage the movement of goods by communicating with tracking systems or control devices (e.g., a programmable logic controller (PLC)), goods management units (e.g., handling units), etc. The WMS may communicate with the above subsystems over a network using known protocols (e.g., Local Area Network (LAN) using known communication protocols like Transmission Control Protocol/Internet Protocol (TCP/IP). In an embodiment, the data about the goods in the warehouse may be collected and synchronized with a central database. Reports about the status of goods in the warehouse may be generated from such data. In an embodiment, WMS may be standalone systems or modules of an enterprise resource planning (ERP) system. Typically, the WMS may track the goods during the production process, act as an interpreter and message buffer between existing ERP and WMS systems.

Figure 1:
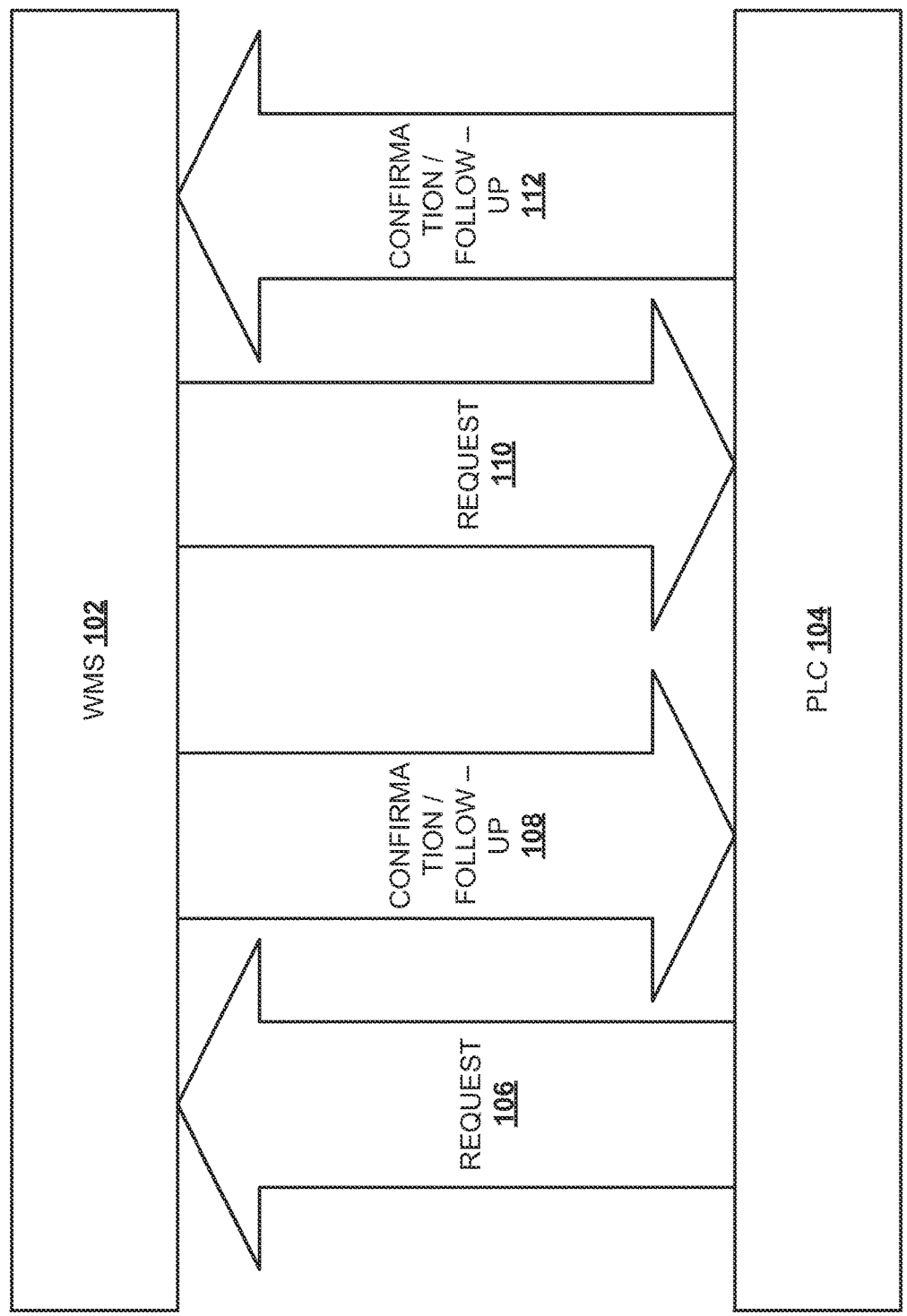
FIG. 1 is a block diagram illustrating a request-reply based communication, according to an embodiment.

FIG. 1 is a block diagram illustrating a request-reply based communication, according to an embodiment. By way of illustration, FIG. 1 shows a request-reply based communication between WMS 102 (e.g., enterprise application) and PLC 104 (e.g., control device). Typically, communication between WMS 102 and PLC 104 may be using string based messages (e.g., may also be referred to as telegrams). By way of example, such messages may include information related to requests (e.g., 106, 110), follow-up actions and/or confirmation on execution of processes (e.g., 108, 112), acknowledgements, etc.

In an embodiment, WMS 102 may receive a request 106 from PLC 104. The WMS 102 may process request 106 successfully or there may be a failure to process the request 106. In response to the failure to process request 106, WMS 102 may determine status identifiers. In an embodiment, the status identifiers may indicate errors that may have resulted in response to the failure to process the request. Based on the errors, WMS 102 may be configured to trigger re-processing request 106 after a certain time interval. After a lapse in the time interval, WMS 102 may be asynchronously triggered to re-process request 106.

Figure 2:
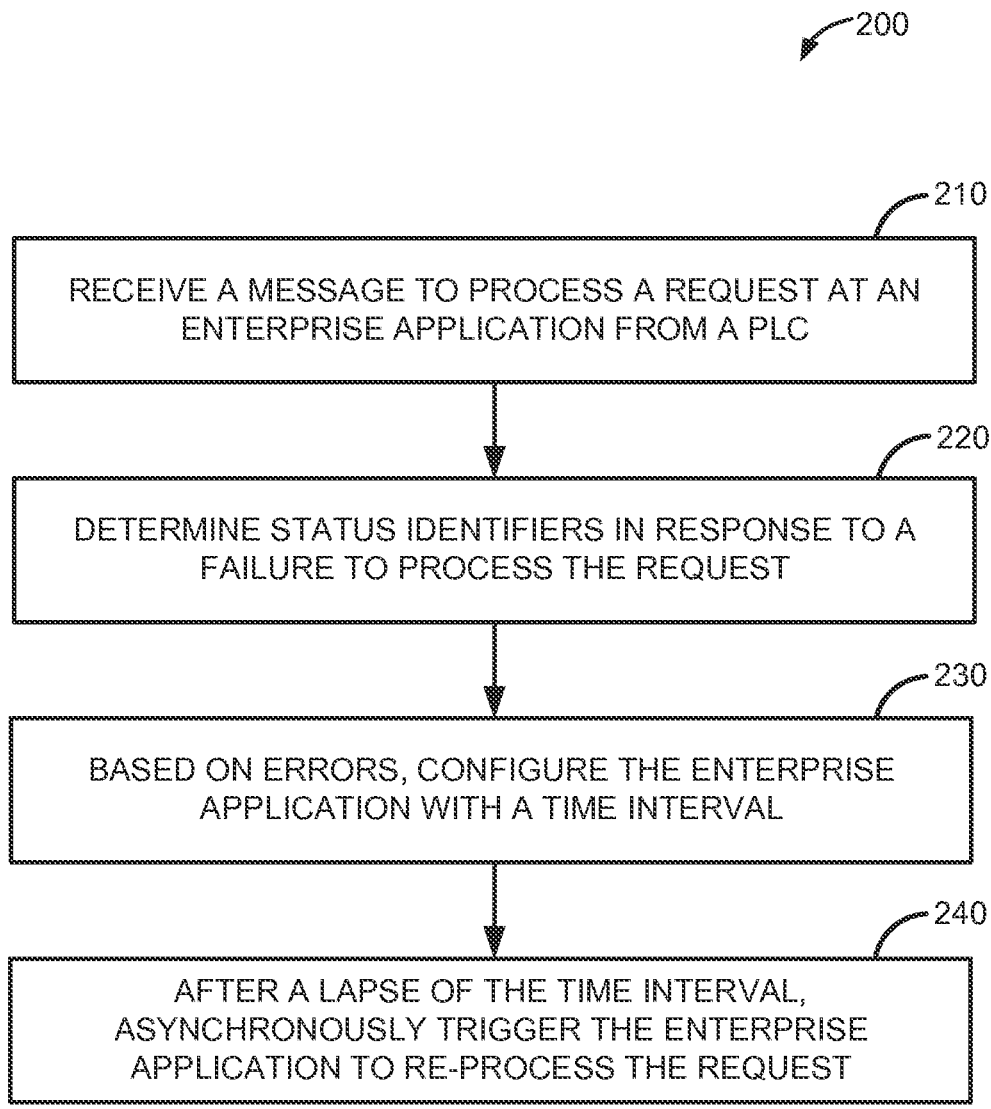
FIG. 2 is a flow diagram illustrating process to re-process a request, according to an embodiment.

FIG. 2 is a flow diagram illustrating process 200 to re-process a request, according to an embodiment. Process 200, upon execution provides a mechanism to re-process a request in an enterprise application. The mechanism to re-process the request may be triggered based on a business logic. The business logic may be dependent on a number of factors (e.g., determining type of errors, determining time interval for resolving the errors, determining context of error, determining time interval for re-processing the request, etc.). In an embodiment, the determination of time interval for resolving errors or re-processing the requests may be dynamic. By way of example, when re-processing of the request fails, the time interval may be dynamically modified (e.g., increased or decreased). The business logic may also include determining whether the error may be resolved automatically after a pre-determined number of attempts to re-process the request.

In an embodiment, the enterprise application may include a WMS. The terms WMS and enterprise application may be used interchangeably. The enterprise application may be implemented to automate operations such as storage, retrieval, etc., of goods between specific locations within the warehouse, between different warehouses, etc. Goods management units (e.g., transportation unit, handling unit (HU), etc.) may facilitate automation of the operations in the warehouse. In an embodiment, the operations may be automated when the systems (e.g., WMS, PLCs, HUs, decision unit, work center, etc.) in the warehouse cooperatively work in conjunction with each other.

In an embodiment, the enterprise application receives a message to process a request from a PLC, at 210. By way of example, such a request may include position information for the handling unit for transporting the goods to a location in the warehouse. The handling unit may communicate with a decision point or a decision unit in the enterprise application to determine the location coordinates or location information. In an embodiment, when the handling unit communicates with the decision point, the PLC may send the request to the enterprise application. The request may include the current position information for the goods and the WMS may determine the direction that the handling unit may need to take to reach the location. The determination may be based on attributes associated with the handling units such as handling unit data, open requests, tasks currently under execution, pending tasks, pending requests, etc.

Figure 3:
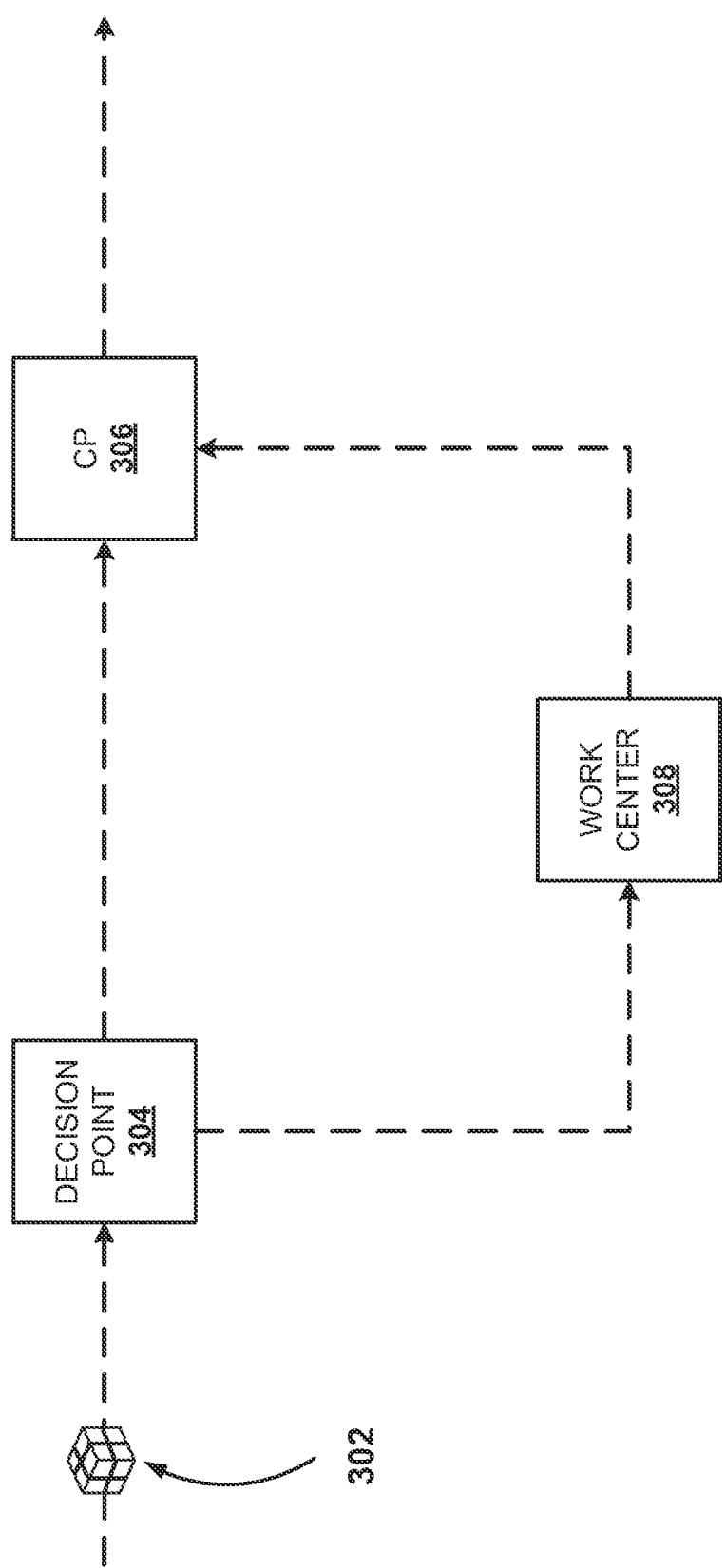
FIG. 3 is a block diagram exemplarily illustrating a communication between a decision point, a communication point and work center, according to an embodiment.

FIG. 3 is a block diagram exemplarily illustrating communication between a decision point, a communication point and work center, according to an embodiment. By way of example, FIG. 3 shows transporting goods 302 in the warehouse by communicating with decision point 304, communication point (CP) 306, work center 308, etc. As explained previously, the WMS may determine the direction to transport the good by communicating with the decision point. In an embodiment, upon such determination, the handling unit may either be directed to work center 308 or communication point 306 in the enterprise application. Once the handling unit reaches the work center or the decision point, the enterprise application (e.g., WMS) may communicate with the PLC that may include a follow-up action to the PLC.

In an embodiment, there may be an error in communication between the PLC and the WMS. For instance, the PLC may send the message to the WMS and may wait for a response or follow-up action, and there may be a failure in processing the message. In another instance, the PLC may send the message to the WMS and may not wait for any response or follow-up action, and there may be a failure in processing the message. The message may fail to process and may result in error in communication between the PLC and WMS.

Referring to FIG. 2, status identifiers are determined in response to the failure to process the request, at 220. The status identifiers may be deployed at various key points in the WMS that may indicate errors (e.g., temporary errors, permanent errors, etc.). By way of example, such errors may include malfunctioning of the goods management units on account of limited capacities of handling units, locked transmission line, incorrect or missing configurations or settings in the management and handling units, etc. Such errors may be identified by the corresponding status identifiers in the enterprise application. Upon identifying the errors, the enterprise application may be configured with different time intervals to re-reprocess the request.

In an embodiment, based on the errors, a time interval in the enterprise application is configured, at 230. The business logic to re-process the request may include configuring the enterprise application to re-process the failed request after a lapse of a time interval. Re-processing the request may further be based on factors such as type or nature of error, physical location of error in the warehouse, context of error, etc. In an embodiment, after a lapse in the time interval, the enterprise application is asynchronously triggered to re-process the request, at 240. In an embodiment, configuring the enterprise application may also include modifying (e.g., setting or resetting) a status associated with the request. By way of example, the status of the request may be modified to 'RETRY', indicating the request may be re-processed after the lapse in the configured time interval.

In an embodiment, when the status for processing a request is modified to 'RETRY', the enterprise application may log the information of such request in a file. Typically, such logging of information may be useful in tracking requests that may have tendency to fail to process, type of errors that resulted due to failure to process requests, etc. The above information may be used by the enterprise application to dynamically determine or identify the requests that may typically fail to process. In an embodiment, the enterprise application may provide detailed information related failure to process the request to an end user managing the operation in the warehouse. The enterprise application may provide the end user to analyze the information and configure the time interval that may be required to re-process the request.

In an embodiment, the enterprise application may need to determine location information about the handling units, before a request is re-processed. By way of example, when the request fails to process resulting in an error, the enterprise application may temporarily halt or stop the handling units. Upon triggering the re-processing mechanism, the enterprise application may resume operations from the position where the handling units were stopped. In an embodiment, when the enterprise application fails to receive such information about the handling units, the enterprise application may not re-process the requests which statuses have been modified to 'RETRY'.

By way of example, goods are transported between locations A and B in the warehouse. In an embodiment, all outstanding requests at location A may have to be processed, before the handling unit transports the goods to location B. Consider a scenario where the goods are transported to location B and there may be a pending follow-up request at location A (e.g., with request status 'RETRY'). In such a scenario, the pending follow-up request at location A may become an outdated request, since the handling unit has already transported the goods to location B. In an embodiment, the enterprise application may be configured to determine the above scenario and modify the status of such requests to 'CANCELLED.' In an embodiment, all pending requests at location A that may be determined as outdated requests may be modified to 'CANCELLED' by the enterprise application.

In an embodiment, consider an instance where a re-processing of a request may fail and may result in errors. The enterprise application may log such instances and provide the end user a report for analysis. Based on the report, the end user managing the operations in the warehouse or the system may determine whether the errors may be automatically resolved or a physical intervention may be necessary for resumption of the operations in the warehouse.

Figure 4:
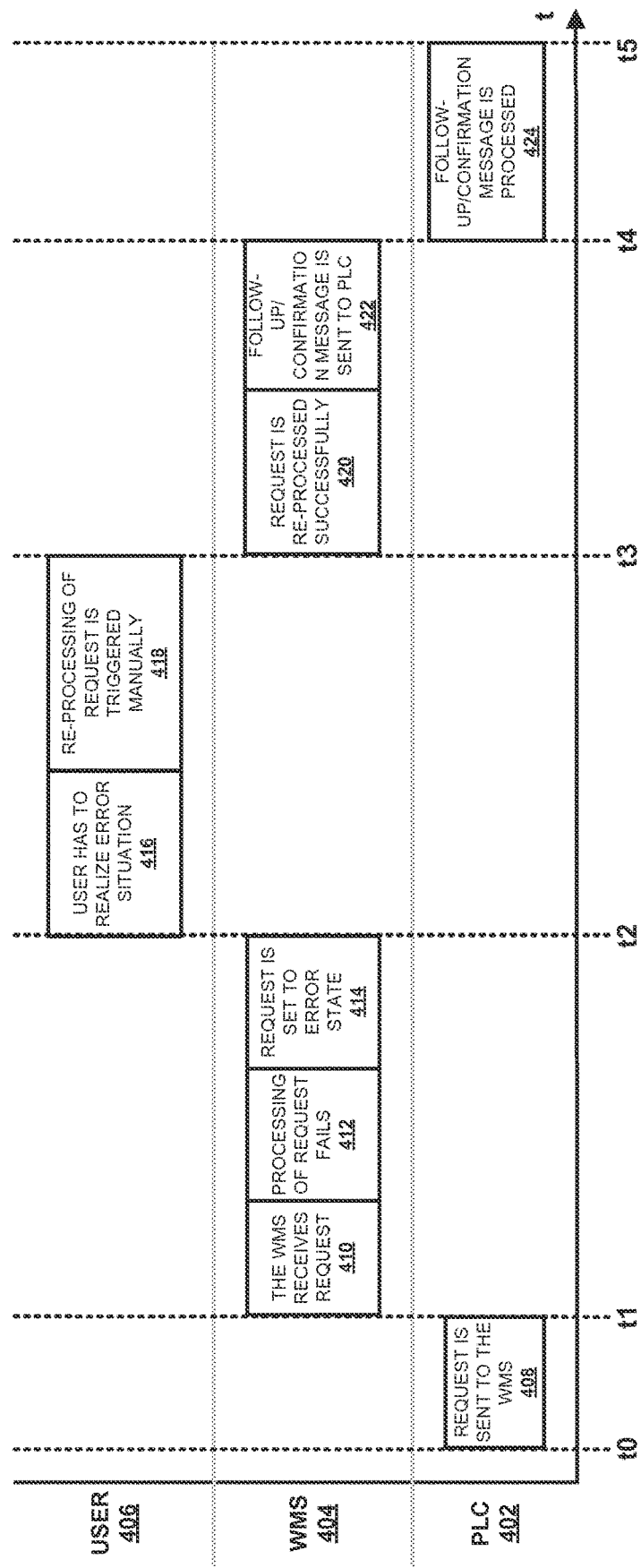
FIG. 4 is a timing diagram for manually triggering a WMS to re-process a request, according to an embodiment.

FIG. 4 is a timing diagram 400 for manually triggering a WMS tore-process a request according to an embodiment. By way of illustration, FIG. 4 shows a failure to process a request. By way of example, consider the error that resulted on account of the failure to process the request is a temporary error. In an embodiment, time interval 't0' to 't1' may correspond to the request (e.g., 408) sent by PLC 402 to WMS 404. Time interval 't1' to 't2' may correspond to sequence of WMS 404 receiving the request (e.g., 410 which is same as 408), and the received request failing to process (e.g., 412), and setting the status of the request to 'ERROR' 414).

In an embodiment, time interval 't2' and 't3' may correspond to an end user 406 notifying the error situation (e.g., 416). The user may manually trigger WMS 404 to reprocess the request (e.g., 418). For instance, user 406 may have to identify the nature of error, intervene to resolve the error and trigger the enterprise application to re-process the request. In an embodiment, time interval 't3' to 't4' may correspond to successfully re-processing the request by WMS 404 (e.g., 420) and a follow-up/confirmation message (e.g., 422) sent to PLC 402. The time interval corresponding to 't4' and 't5' may include processing the follow-up/confirmation message (e.g., 424) that may be sent to PLC 402.

Figure 5:
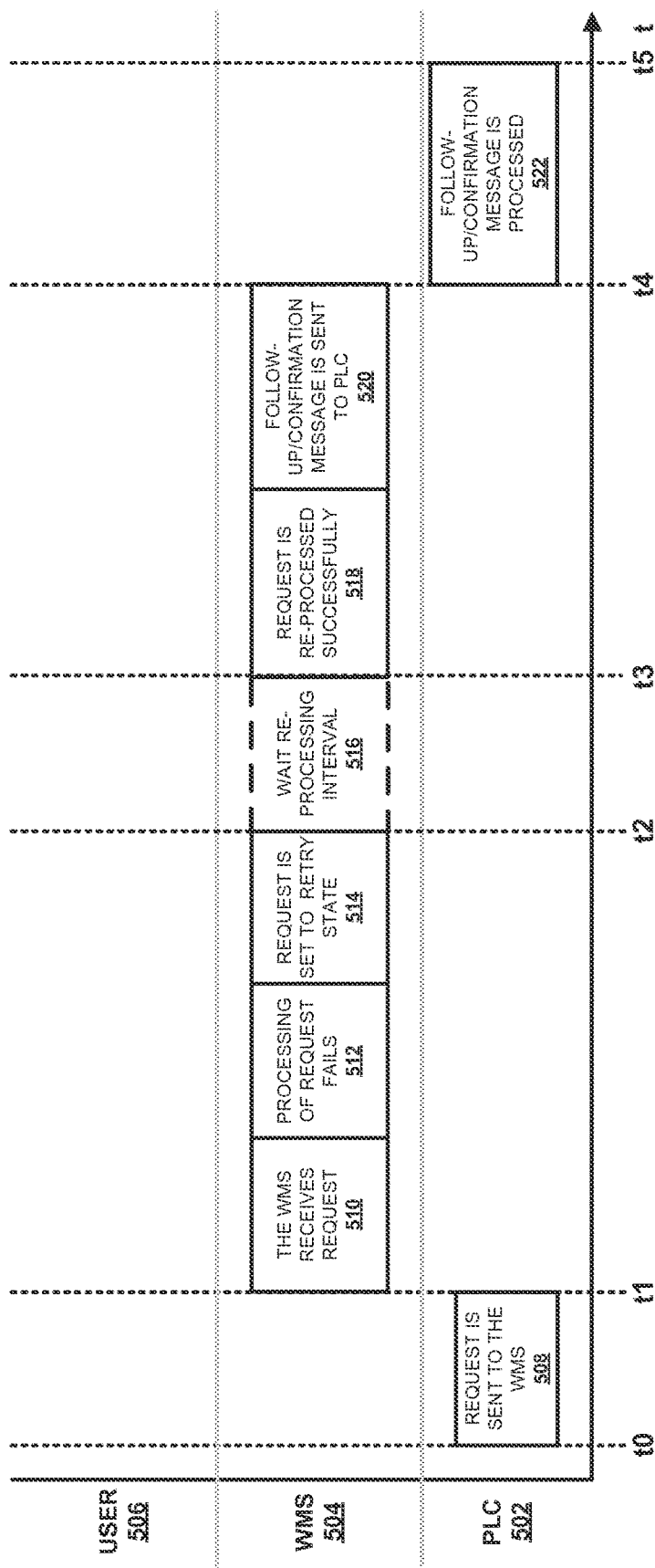
FIG. 5 is a timing diagram for automatically triggering the WMS to re-process a request, according to an embodiment.

FIG. 5 is a timing diagram 500 for automatically triggering a WMS to re-process a request, according to an embodiment. By way of illustration, FIG. 5 shows a failure to process a request. By way of example, let the error that resulted on account of failure to process the request be a temporary error. In an embodiment, time interval 't0' to 't1' may correspond to the request (e.g., 508) sent by PLC 502 to WMS 504. The time interval 't1' to 't2' may correspond to sequence of WMS 504 receiving the request (e.g., 510 which is same as 508), and the received request failing to process (e.g., 512), and setting the status of the request to 'RETRY (e.g., 514).

In an embodiment, the time interval 't2' and 't3' may correspond to time period to lapse (e.g., wait re-processing interval 516) for WMS 504 to re-process the request. In an embodiment, the time interval 't3' to 't4' may correspond to successfully re-processing the request by WMS 504 (e.g., 518) and a follow-up/confirmation message (e.g., 520) may be sent to PLC 502. The time interval corresponding to 't4' and 't5' may include processing the follow-up/confirmation message (e.g., 522) sent to PLC 502.

In an embodiment, the time interval 't2' to 't3' of FIG. 4 may be based on other factors. For instance, such factors may include evaluation of error by the user based on error messages, logs, conditions attributing the error, context of the error, location of the error, etc. The time interval from 't2' to 't3' in FIG. 4 may be dynamically increased based on the above factors, thereby increasing the overall time consumed to re-process the request. However, as explained previously, automating the enterprise application to re-process the request may reduce the overall time consumed to re-process the request by automatically triggering the enterprise application. As shown in FIG. 5, the corresponding time interval between 't2' and 't3' may be substantially shorter, when there is no user 506 intervention to trigger the WMS to re-process the request. Therefore, automating the process awaiting for a pre-determined time to reprocess the request and timely resumption of operations in the warehouse may substantially reduce the operational costs and delays.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application fore server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of or in combination with machine readable software instructions.

Figure 6:
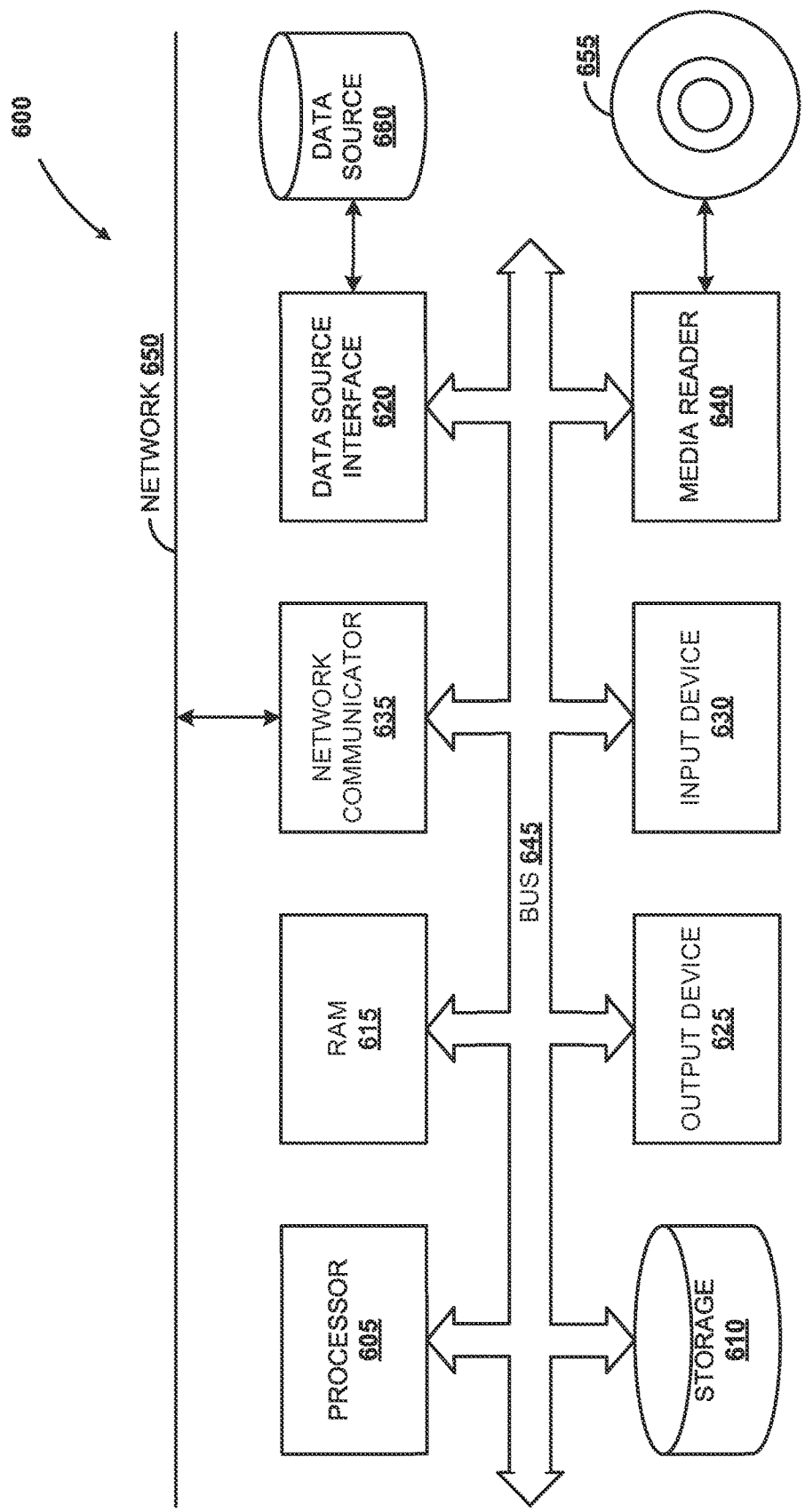
FIG. 6 is a block diagram of a computer system, according to an embodiment.

FIG. 6 is a block diagram of an exemplary computer system 600, according to an embodiment. Computer system 600 includes processor 605 that executes software instructions or code stored on computer readable storage medium 655 to perform the above-illustrated methods. Processor 605 can include a plurality of cores. Computer system 600 includes media reader 640 to read the instructions from computer readable storage medium 655 and store the instructions in storage 610 or in random access memory (RAM) 615. Storage 610 provides a large space for keeping static data where at least some instructions could be stored for later execution. According to some embodiments, such as some in-memory computing system embodiments, RAM 615 can have sufficient storage capacity to store much of the data required for processing in RAM 615 instead of in storage 610. In some embodiments, all of the data required for processing may be stored in RAM 615. The stored instructions may be further compiled to generate other representations of the instructions and dynamically stored in RAM 615. Processor 605 reads instructions from RAM 615 and performs actions as instructed. According to one embodiment, computer system 600 further includes output device 625 (e.g., a display) to provide at least some of the results of the execution as output including, but not limited to, visual information to users and input device 630 to provide a user or another device with means for entering data and/or otherwise interact with computer system 600. Each of these output devices 625 and input devices 630 could be joined by one or more additional peripherals to further expand the capabilities of computer system 600. Network communicator 635 may be provided to connect computer system 600 to network 650 and in turn to other devices connected to network 650 including other clients, servers, data stores, and interfaces, for instance. The modules of computer system 600 are interconnected via bus 645. Computer system 600 includes a data source interface 620 to access data source 660. Data source 660 can be accessed via one or more abstraction layers implemented in hardware or software. For example, data source 660 may be accessed by network 650. In some embodiments data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to re-process a request, comprising:
an enterprise application receiving a message to process a request from a programmable logic controller;
determining one or more status identifiers, the one or more status identifiers indicating one or more errors in response to a failure to process the request;
based on a determination of one or more contexts of the one or more errors, dynamically determining a time interval corresponding to the one or more contexts of the one or more errors to be configured at the enterprise application to re-process the received request, wherein the one or more errors correspond to one or more temporary errors or one or more permanent errors; and
after a lapse of the time interval, asynchronously triggering the enterprise application to re-process the received request.

2. The computer implemented method of claim 1, wherein configuring the enterprise application to re-process the request includes modifying a status of the request to retry, the status indicating the request to be re-processed after the lapse of the time interval.

3. The computer implemented method of claim 1, further comprises: modifying a status of the request to cancel, when the enterprise application determines that the request is an outdated request.

4. The computer implemented method of claim 1, further comprising: upon successfully re-processing the request, the enterprise application sending a message to the programmable logic controller, the message including one or more follow-up actions and one or more responses indicating a completion of processing the request.

5. The computer implemented method of claim 1, wherein the enterprise application comprises a warehouse management application.

6. The computer implemented method of claim 1, wherein the message is selected from a group consisting of follow-up actions, responses, and acknowledgements.

7. A computer system to re-process a request, comprising:
a memory storing computer instructions; and
a processor communicatively coupled with the memory to execute the instructions to:
receive a message by an enterprise application to process a request from a programmable logic controller;
determine one or more status identifiers, the one or more status identifiers indicating one or more errors in response to a failure to process the request;
based on a determination of one or more contexts of the one or more errors, dynamically determine a time interval corresponding to the one or more contexts of the one or more errors to be configured at the enterprise application to re-process the received request, wherein the one or more errors correspond to one or more temporary errors or one or more permanent errors; and
after a lapse of the time interval, asynchronously trigger the enterprise application to re-process the received request.

8. The computer system of claim 7, wherein configuring the enterprise application to re-process the request includes modifying a status of the request to retry, the status indicating the request to be re-processed after the lapse of the time interval.

9. The computer system of claim 7, further comprises: modifying a status of the request to cancel, when the enterprise application determines that the request is an outdated request.

10. The computer system of claim 7, further comprising: upon successfully re-processing the request, the enterprise application sending a message to the programmable logic controller, the message including one or more follow-up actions and one or more responses indicating a completion of processing the request.

11. The computer system of claim 7, wherein the enterprise application comprises a warehouse management application.

12. The computer system of claim 7, wherein the message is selected from a group consisting of follow-up actions, responses, and acknowledgements.

13. A non-transitory computer readable storage medium tangibly storing instructions, which when executed by a computer, cause the computer to execute operations comprising:
  receive a message at an enterprise application to process a request from a programmable logic controller;
  determine one or more status identifiers, the one or more status identifiers indicating one or more errors in response to a failure to process the request;
  based on a determination of one or more contexts of the one or more errors, dynamically determine a time interval corresponding to the one or more contexts of the one or more errors to be configured at the enterprise application to re-process the received request, wherein the one or more errors correspond to one or more temporary errors or one or more permanent errors; and
  after a lapse of the time interval, asynchronously trigger the enterprise application to re-process the received request.

14. The non-transitory computer readable storage medium of claim 13, wherein configuring the enterprise application to re-process the request includes modifying a status of the request to retry, the status indicating the request to be re-processed after the lapse of the time interval.

15. The non-transitory computer readable storage medium of claim 13, further comprising: upon successfully re-processing the request, the enterprise application sending a message to the programmable logic controller, the message including one or more follow-up actions and one or more responses indicating a completion of processing the request.

16. The non-transitory computer readable storage medium of claim 13, wherein the enterprise application comprises a warehouse management application.

17. The non-transitory computer readable storage medium of claim 13, wherein the message is selected from a group consisting of follow-up actions, responses, and acknowledgements.

* * * * *